July 10, 1956
J. GRILLO
2,754,468
FREQUENCY REGULATING APPARATUS
Filed July 5, 1951
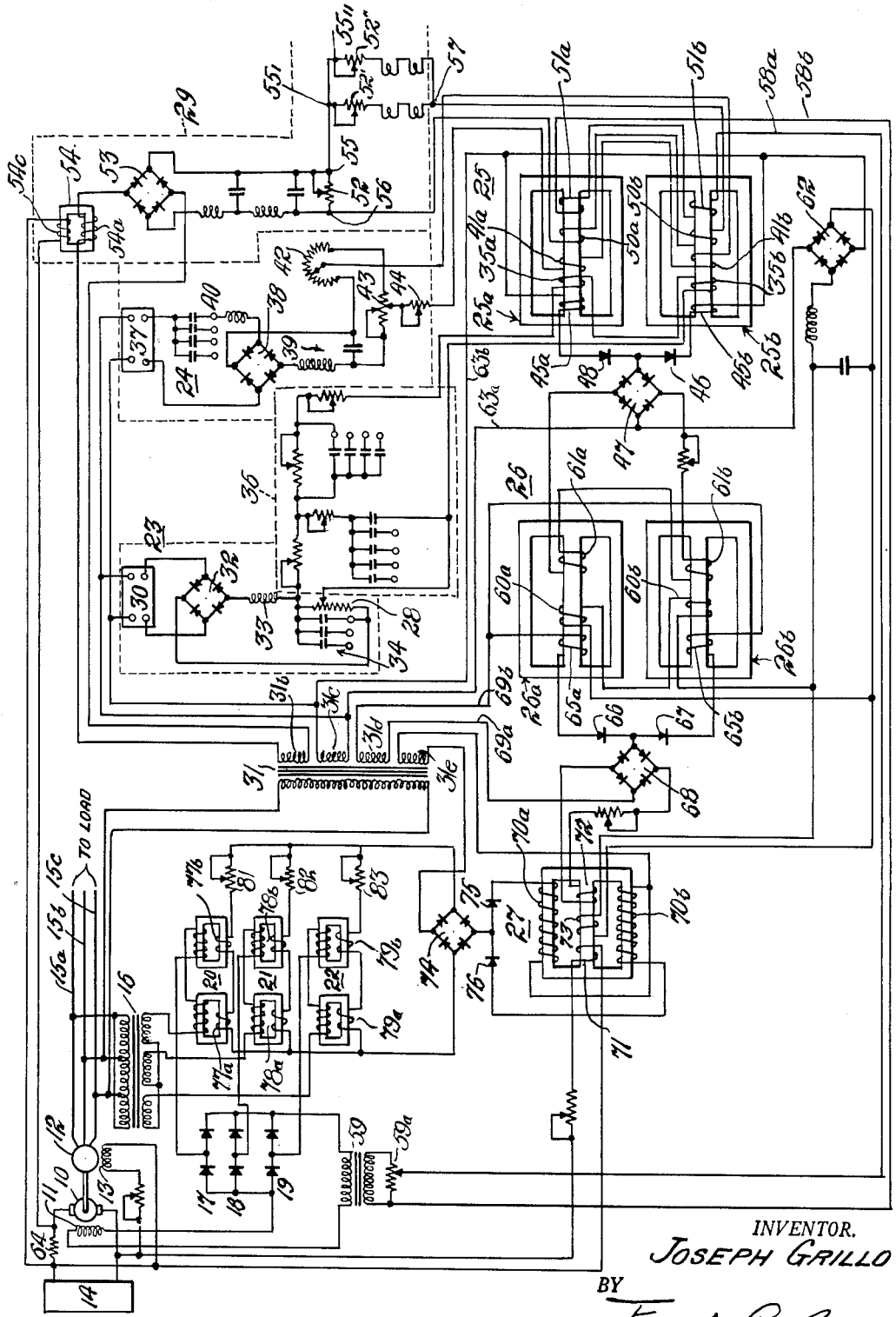
INVENTOR.
JOSEPH GRILLO
BY
Frank A. Bower
ATTORNEY

United States Patent Office 2,754,468
Patented July 10, 1956

2,754,468

FREQUENCY REGULATING APPARATUS

Joseph Grillo, New York, N. Y., assignor to Ward Leonard Electric Company, a corporation of New York Application July 5, 1951, Serial No. 235,245

5 Claims. (Cl. 322—24)

This invention relates to frequency regulating apparatus and more particularly to regulating the frequency of the output voltage of the generator of a motor-generator set.

The main object of this invention is to regulate the frequency of the output voltage of a generator within close limits under variations of load and input voltage to the motor. Another object of this invention is to maintain the output of a D. C.-A. C. motor generator set at constant frequency when the motor is driven from a direct current power supply having a line voltage variable over a considerable range. Another object is to maintain the output of a plurality of motor-generator sets connected in parallel in balance. Another object is to produce a quick and determinative control of the generator output in response to small variations in the frequency of the output voltage. Another object is to provide a frequency control circuit that is stable with the input voltage to the motor varying over a wide range.

Other and further objects of the invention will be understood from the following description taken in connection with the accompanying drawing which illustrates the frequency regulating apparatus controlling the frequency of the output of the three-phase generator of a motor-generator set connected in parallel with the output of other similar generators to a load.

The accompanying drawing is a diagram showing the various parts of the apparatus and their connections for the automatic regulation of the frequency of the generator. The automatic regulation of the voltage of the generator through the generator field winding has been omitted and may be of the type shown and described in my co-pending application entitled "Voltage Regulators," Serial No. 193,191, filed October 31, 1950, U. S. Patent No. 2,635,223. Also the apparatus for changing from automatic control to manual control and manual control to automatic control have also been omitted for simplicity of disclosure.

The motor-generator set comprises a direct current motor 10 with a field winding 11 and a three-phase alternating current generator 12 with a field winding 13. The motor 10 is driven by a direct current power source 14 such as storage batteries connected to the armature of the motor 10. The generator 12 is in turn driven by the motor 10 and impresses on the output lines 15a, 15b, 15c a three-phase alternating current. The field winding 13 is energizedl by the current source 14. The field winding 11 is energized by a direct current derived from the lines 15a, 15b, 15c through the transformer 16 and the rectifiers 17, 18, and 19.

The field current through the winding 11 is regulated by a line voltage compensation circuit and a frequency control circuit coupled to the field winding 11 through the saturable reactors 20, 21, 22. The frequency control is derived from the comparison of the output voltages and currents of the frequency detector 23 and the constant voltage and frequency reference circuit 24 coupled to the output lines 15a, 15b. The difference of these two circuits is impressed on the saturable reactors 20, 21, 22 through the magnetic amplifier stages 25, 26, 27 to impress a correction on the current in the field winding 11 reflecting the frequency difference. The compensation circuit is connected to the output lines of the power supply 14 and comprises a control current on the saturable reactors through the last magnetic amplifier stage 27 to adjust the current through the winding 11 as the output voltage of the power supply changes during long periods of operation. The compensation circuit controls the frequency of the generator within broad limits and the frequency control circuit maintains the generator on frequency.

Considering the frequency control circuit in detail, the frequency detector circuit 23 comprises a constant voltage transformer 30 that is insensitive to input voltage changes in the operating range of the generator and is sensitive to frequency changes. The transformer 30 is connected to the output lines 15a and 15b through the secondary winding 31c of the transformer 31 to impress the variations in the output lines thereon. The drift of the generator voltage will not appear in the output of the frequency detector but variations in the frequency of the output lines will create a corresponding variation in the amplitude of the output voltage of the transformer 30. These variations are changed into a varying direct voltage across resistor 28 by the full wave bridge rectifier 32, choke 33 and capacitors 34 and are impressed on the windings 35a, 35b of the reactors 25a and 25b respectively through the network 36. This network corrects the transmission characteristics of the system so as to produce stable operation.

The rectified variable output of the frequency detector circuit 23 is matched against the output of the reference circuit 24. The reference circuit is a constant voltage circuit, independent of supply voltage and frequency. The reference circuit comprises a constant voltage transformer 37 having a circuit similar to transformer 30 and a series resonant circuit 40. The output of transformer 37 has a constant voltage which varies with frequency changes. The series resonant circuit 40 corrects the changes in voltage with frequency and places across the rectifier 38 a voltage that is constant with variations of frequency and voltage in the output line. This alternating output voltage of transformer 37 is rectified by the rectifier 38 and smoothed out by filter 39. The direct reference voltage is impressed across the control rheostats 42 and 43 and apportioned between the windings 41a, 41b of the first stage amplifier. The transformer 37 is connected to the lines 15a, 15b through the secondary winding 31c and has a constant output. The rheostat 42 is used to set the speed of the motor and thereby the frequency of the generator. The output of the voltage reference circuit 24 remains constant while the output of the frequency detector circuit varies. An increase in the frequency of the output voltage increases the output of the frequency detector circuit and a decrease in frequency lowers the output. The outputs of the two circuits are impressed on the amplifier 25 in opposition to one another so that the difference of the two outputs affects the magnetic amplifiers. Frequency departures vary this difference and may reverse it.

The first magnetic amplifier stage 25 comprises two saturable reactors 25a and 25b connected in parallel through rectifier valves 48, 46. The amplifiers are identical, each having a three-legged core with all windings on the middle leg. The amplifiers 25a and 25b have anode windings 45a and 45b respectively connected in parallel and produce fluxes in their respective legs. The anode winding 45a is connected to one terminal of the full wave rectifier 47 through the half-wave rectifier 48. The anode winding 45b is connected to the same terminal of the full wave rectifier 47 through the half-wave rectifier 46. The half-wave rectifiers are connected to supply an alternating current to the rectifier 47, one-half cycle being supplied through reactor 25a and the other half cycle through reactor 25b.

The respective control windings of the reactor 25a and reactor 25b are connected in series so that the same controlling current passes through each of the amplifiers and are balanced. Control windings 35a, 35b are connected across the frequency detector 23 and windings 41a, 41b are connected across the constant voltage reference circuit 24. The control windings 35a, 35b and control windings 41a, 41b have opposing fluxes. The windings 35a, 35b produce fluxes additive to the flux of the anode windings on the portion of the cycle conducted through the half-wave rectifiers. The fluxes of the windings 41a, 41b buck the fluxes of the anode windings 45a, 45b. The difference in the fluxes controls the saturation of the magnetic amplifier. If the output voltage of the generator 12 is on frequency the fluxes of the control windings 35a, 35b are substantially equal and opposite to the fluxes of the control windings 41a, 41b respectively and there is no control exerted. If the frequency decreases the flux of the windings 41a, 41b will control and the output of the first stage will decrease and the saturation of the reactors 20, 21, 22 will decrease, reducing the field winding current and thus speed the motor up. If the output voltage frequency increases the windings 35a, 35b will have a larger current and the fluxes will be additive to the flux of the anode winding increasing the output of the first amplifier stage and increase the saturation of the reactors 20, 21, 22 and increase the field current, thus reducing the motor speed.

Two additional control windings 50a, 50b and 51a, 51b are provided on the middle core of the reactors 25a, 25b respectively.

The generator 12 is connected in parallel with two other generators (not shown). The output voltages of the generators are equal and the generators divide the load equally between them. To maintain the proper load distribution each generator is provided with a parallel control circuit 29 with their outputs connected in parallel as shown in the drawing. The parallel control circuit comprises a saturable reactor 54, a full wave bridge rectifier 53, and a resistor 52. The control winding 54c is coupled with the armature circuit through the resistor 64 and has a direct current proportional to the armature current of the motor which in turn is a function of the watt load on the generator. The voltage across resistor 52 is controlled by this direct current. When the loads on all the generators are equal the voltage across the resistors 52 are equal and there is no current flow through the control windings. When the loads are unequal the unequal voltages across resistors 52, 52', 52'' cause currents to flow in the windings 51a, 51b in such a direction to cause a corrective action to equalize the loads by changing the excitation on the motor field. If the other generators have corresponding changes in their parallel control circuits the generators are in balance and no corrective action occurs.

The main windings 54a and secondary winding 31b are in series across rectifier 53 and impress the controlled alternating current thereon. The terminal 55 of the resistor 52 is connected to similar terminals 55', 55'' of the other motor generator sets forming a common terminal. The other terminal 56 is connected through the control windings 50a, 50b to a common terminal 57. Thus the load resistors and control windings of each generator are connected in parallel with each other. With the outputs of the generators having the load equally divided the voltage impressed across the load resistors will be equal and no current will flow through the control windings 50a, 50b. If the load distribution shared by motor 10 increases or decreases, the control current that is proportional to the armature current will correspondingly change the current through the output windings 54a and the potential across resistor 52. This change will unbalance the common terminals 55 and 57 and cause current to flow in one direction through control windings 50a, 50b and in the other direction in the control windings of the other generator control circuits. As an example, if the motor 10 is not carrying its share of the load the current in control windings 50a, 50b is in a direction to buck the flux of the anode windings 45a, 45b of reactors 25a, 25b and decreases the current in the field winding 11 and the motor delivers more power to the generator. In the other generators the motor field currents are increased to decrease the power delivered to the generators.

The anti-hunt control windings 51a, 51b are connected by lines 58a, 58b to the transformer 59 in the circuit of the field winding 11. The transformer applies a transient feedback to the control windings 51a, 51b creating a transient flux which opposes the transient currents in the control windings 35a and is to improve the stability of the system. The potentiometer 59a provides an adjustment of the amount of anti-hunt correction.

The second magnetic amplifier stage 26 comprises two parallel three legged reactors 26a, 26b with bias windings 60a, 60b, control windings 61a, 61b and anode windings 65a, 65b wound around the center leg of the respective reactor. A bias current is derived from the bias-rectifier 62 to adjust the reactor in the proper operating range. The rectifier 62 is a full wave rectifier with the input coupled to the secondary winding 31c of the transformer 31 by the lines 63a, 63b. The control windings 61a, 61b provide a flux additive to the flux of the anode windings 65a and 65b respectively. The rectifiers 66, 67 are connected to supply an alternating current to the full wave rectifier 68, one-half of the cycle from amplifier 26a, the other half of the cycle from amplifier 26b. The anode windings are supplied from the secondary winding 31c connected by the lines 69a, 69b across the rectifier 68 and anode windings 65a and 65b in parallel by lines 69a, 69b.

The last stage 27 comprises a single three legged core reactor with two parallel anode windings 70a, 70b on the outer legs and control windings 71, 72 with bias windings 73 on the middle leg. The bias current is derived from the rectifier 62 and creates a flux in the core to set the reactor at its proper operating range. The parallel anode windings 70a, 70b are connected to the full wave output rectifier 74 through the respective half-wave rectifiers 75, 76 and are alternately supplied with current from the secondary winding 31e. The direct current output of the rectifier 74 is connected to the control windings 77a, 77b, 78a, 78b; and 79a, 79b of the reactors 20, 21, 22 connected in parallel. The division of the current between the control windings is determined by adjusting the potentiometers 81, 82, 83 connected in series with respective control windings and set at a value to saturate the cores of the reactors at the proper portion of the saturation curve.

The winding 71 is connected to the output of the power source and forms the line voltage compensation circuit to adjust the field current of winding 11 as the output voltage changes. As the line voltage increases tending to increase the speed of the motor, more current flows through winding 71 which causes an increase in the field current slowing the motor down. The control winding 72 receives the correction for changes in the frequency of the output of the generator. As the frequency increases a correction is applied increasing the field current slowing the motor down or as the frequency decreases a correction is applied decreasing the field current speeding the motor up. The controls supplied by the two circuits are combined in the reactor 27 to maintain the generator on frequency with high circuit stability.

The regulator operates with stability over a 2:1 range of the D. C. input voltage. This is a large change in voltage applied and requires a large change in excitation on the motor in order to maintain the speed and frequency constant. The correction of this D. C. input voltage change by the compensation circuit contributes greatly to the stability of the system.

Although the above disclosure describes the frequency regulation of a three-phase generator, the apparatus may be readily adapted to control a single phase or two phase output.

Various other adaptations and modifications of the invention may be made according to particular requirements and various types of devices used various relationships for securing the objects of the invention without departing from the scope thereof.

I claim:

1. A speed regulator for maintaining the alternating output of a generator driven by an electric motor at a desired frequency comprising a magnetic amplifier having an anode winding and first and second control windings, constant voltage and frequency means with a constant voltage transformer coupled to the output of the generator and supplying to the first control winding a constant direct current to create a constant reference flux therein, frequency responsive means with a frequency transformer coupled to the output of the generator and supplying to the second control winding a direct current to produce a flux combining said reference flux to create a resulting flux between said windings varying the output voltage of said reactor in accordance with the generator frequency departure, and means for connecting said reactor output to said motor for impressing the variations of the output voltage thereon and correcting the generator frequency to the desired frequency.

2. A speed regulator as claimed in claim 1 wherein said first control windings of said amplifier have a flux in opposition to the flux of the anode windings of the respective amplifiers and said second control winding having a flux additive to said anode winding flux when the generator is on frequency and increasing on an increase in frequency and decreasing on a decrease in frequency thereby increasing the field current to decrease the frequency and decrease the field current to increase the output frequency.

3. A speed regulator for controlling the frequency of the alternating output of a generator driven by a direct current motor having a field winding comprising a first magnetic amplifier having an anode winding supplied from the output of the generator and first and second control windings, constant voltage and frequency means coupled to the output of the generator and supplying the first control winding a constanct direct current to create a reference flux therein, frequency responsive means coupled to the output of the generator and supplying to the second control winding a direct current to create a resulting flux from the fluxes of said first and second windings varying the output voltage of said first reactor in accordance with the generator frequency departures, a second magnetic amplifier having an anode winding supplied from the output of the generator and having a third and fourth control windings, the third control winding receiving from the motor direct current source a direct current creating a flux in said second amplifier reflecting the variations in the motor current, the fourth control winding coupled to the output of said first amplifier to control the output of the second amplifier in accordance therewith, means connected to the output of said second amplifier for controlling the field current in the field winding of the motor in accordance with the variations in the output of the second amplifier.

4. A speed regulator for controlling the frequency of the alternating output of a generator driven by a direct current motor having a field winding controlling the speed of the motor and supplied by a primary power source having a voltage changeable over a wide range comprising saturable reactors, rectifiers connecting said field winding to said reactors to supply said field winding with a direct current, a frequency detector coupled to the output of said generator to provide a correction with variations in the frequency of the generator voltage, a magnetic amplifier having two control windings, one of said control windings being connected to the output of said primary power source and the other connected to said frequency detector, said saturable reactors having control windings coupled to the output of said magnetic amplifier to vary the field current in response to the variations in the voltage of the primary power source and the frequency of the generator voltage.

5. A speed regulator for controlling the frequency of the alternating output of a generator driven by a direct current motor having a field winding controlling the speed of the motor and supplied by a primary power source having a voltage changeable over a wide range and comprising a magnetic amplifier having an anode winding coupled to said motor field winding to control the field current and correct the speed of said motor, said amplifier having a core with a first and second control winding, a frequency detector means coupled between said generator output and said first control winding to vary the field current to correct for variations in the frequency of the alternating output voltage, said second control winding coupled to said power source and wound on said core to create a flux therein changing over the wide voltage range of said power source to maintain the motor at the desired speed level and condition the amplifier to render the frequency detector means effective over the entire range voltage variation of the power source.

References Cited in the file of this patent

UNITED STATES PATENTS

| | | |
|---|---|---|
| 2,254,899 | Laubenheimer et al. | Sept. 2, 1941 |
| 2,531,727 | Emerson | Nov. 28, 1950 |
| 2,610,315 | McKendry et al. | Sept. 9, 1952 |
| 2,691,756 | Schaelchlin et al. | Oct. 12, 1954 |